(12) United States Patent
Loeffler et al.

(10) Patent No.: US 8,726,924 B2
(45) Date of Patent: May 20, 2014

(54) FLOW-CONTOL VALVE

(75) Inventors: Gerhard Loeffler, Olsberg (DE); Stefan Brambring, Olsberg (DE)

(73) Assignee: Oventrop GmbH & Co. KG, Olsberg (DE)

( * ) Notice: Subject to any disclaimer, the term of this patent is extended or adjusted under 35 U.S.C. 154(b) by 204 days.

(21) Appl. No.: 13/277,709

(22) Filed: Oct. 20, 2011

(65) Prior Publication Data
US 2012/0111433 A1 May 10, 2012

(30) Foreign Application Priority Data
Nov. 10, 2010 (DE) .......... 10 2010 050 953

(51) Int. Cl.
*G05D 11/02* (2006.01)
*F16K 47/16* (2006.01)

(52) U.S. Cl.
USPC .......... 137/87.01; 137/98; 251/121

(58) Field of Classification Search
USPC .......... 137/87.01, 98, 510, 595, 625.18; 251/121, 122
See application file for complete search history.

(56) References Cited

U.S. PATENT DOCUMENTS

| | | | |
|---|---|---|---|
| 1,257,070 A * | 2/1918 | Discher | 137/625.18 |
| 1,287,258 A * | 12/1918 | Discher | 137/625.18 |
| 3,085,590 A * | 4/1963 | McIlhenny | 137/501 |
| 3,099,282 A * | 7/1963 | Miller et al. | 137/87.01 |
| 3,236,261 A * | 2/1966 | Morgan | 137/628 |
| 3,557,831 A * | 1/1971 | Katchka | 137/613 |
| 3,580,284 A * | 5/1971 | Bini et al. | 137/625.18 |
| 4,826,132 A * | 5/1989 | Moldenhauer | 251/129.17 |
| 5,918,621 A * | 7/1999 | Gilmore | 137/87.01 |
| 6,929,187 B2 * | 8/2005 | Kempf et al. | 236/12.11 |

FOREIGN PATENT DOCUMENTS

DE 29614765 U 12/1998

* cited by examiner

*Primary Examiner* — John Rivell
*Assistant Examiner* — Seth W Mackay-Smith
(74) *Attorney, Agent, or Firm* — Andrew Wilford

(57) ABSTRACT

A flow-control valve has a housing having first and second input ports and respective first and second output ports for respective first and second separate fluid streams and formed between the first and second port with first and second valve seats. Respective first and second valve bodies are axially shiftable in the valve seats, and a coupling element connected axially between the valve bodies moves the valve bodies axially jointly. A diaphragm between the first piston and the housing defines an axially inner compartment into which the first input port opens and between the diaphragm and the housing an axially outer compartment. The first valve body is formed with a passage extending through the first valve body and having an axially extending part opening into the outer compartment and a transversely extending part opening into the housing between the first seat and the first output port.

10 Claims, 3 Drawing Sheets

FLOW-CONTOL VALVE

FIELD OF THE INVENTION

The present invention relates to a flow-control valve. More particularly this invention concerns a dual valve for controlling the flow of two separate fluid streams.

BACKGROUND OF THE INVENTION

As described in German patent publication 296 14 765, a flow-control valve has a housing extending along an axis and having first and second input ports and respective first and second output ports for respective first and second separate fluid streams and formed between the first input port and second input port with a first valve seat and between the second input port and second output port with a second valve seat offset axially from the first valve seat. Respective first and second valve bodies are axially shiftable between positions blocking and unblocking the respective valve seats. A coupling element connected axially between the valve bodies for joint movement of the valve bodies. A diaphragm connected between the first piston and the housing defines between the diaphragm and the first valve seat an axially inner compartment into which the first input port opens and between the diaphragm and the housing an axially outer compartment.

In this system the housing is formed with a passage having one end opening into the housing between the first valve seat and the first outlet and at an opposite end into the outer compartment. Thus the pressure of the first stream upstream of the first valve seat is applied to the inner face of the diaphragm and the pressure of the first stream downstream of the first valve seat is applied to the outer face of the diaphragm. Thus this differential pressure across the first valve seat controls both of the separate valve assemblies. This is a relatively complex construction.

Another problem with the known systems is that the valve seats and valve bodies fit together in a very precise manner, and they tend to lime up. Significant lime deposits largely incapacitate the valves and require servicing or even replacement of them.

OBJECTS OF THE INVENTION

It is therefore an object of the present invention to provide an improved flow-control valve, in particular for heating and/or cooling systems.

Another object is the provision of such an improved flow-control valve that overcomes the above-given disadvantages, in particular that of simple and inexpensive construction.

A further object is to provide such a valve that is less likely to be disable by lime deposits.

SUMMARY OF THE INVENTION

A flow-control valve has according to the invention a housing extending along an axis and having first and second input ports and respective first and second output ports for respective first and second separate fluid streams and formed between the first input port and second input port with a first valve seat and between the second input port and second output port with a second valve seat offset axially from the first valve seat. Respective first and second valve bodies are axially shiftable between positions blocking and unblocking the respective valve seats, and a coupling element connected axially between the valve bodies moves the valve bodies axially jointly. A diaphragm connected between the first piston and the housing defines between the diaphragm and the first valve seat an axially inner compartment into which the first input port opens and between the diaphragm and the housing an axially outer compartment. The first valve body is formed with a passage extending through the first valve body and having an axially extending part opening into the outer compartment and a transversely extending part opening into the housing between the first seat and the first output port.

This configuration does not require the formation of an inclined bore in the housing as in the prior art, which is disadvantageous in terms of costs because the direction of machining is not in line with the normal clamping position of the element. In addition, it is not necessary to arrange and fix an additional sleeve for forming an annular chamber. Furthermore, No additional O-ring or a similar seal is needed between the cap forming the outer compartment and the housing. The configuration according to the invention only requires an axial and a transverse or radial bore in the piston. These measures which can be carried out in a simple manner with respect to the first piston and also with respect to the diaphragm piston do not cause high costs. This results also in the fact that the sleeve previously required in the art for generating an annular chamber becomes superfluous. Also, sealing the cover cap against the housing can be simplified.

In a preferred manner the bore runs centrally with respect to the center axis of the first piston and the diaphragm piston, and near a coupling point of a rod connected to the second piston the transverse bore runs perpendicular to the bore.

In a particularly preferred manner the diaphragm piston is sealingly connected via the annular diaphragm at inner periphery of same to the first piston and the diaphragm is sealingly clamped at an outer periphery between the housing cap and a housing part onto which the housing cap is fastened.

With this arrangement and configuration it is possible to only use the edge of the perforated diaphragm instead of the O-ring previously required in the art so that the additional seal can be completely eliminated without facing any disadvantages.

In order to ensure a long service life of the diaphragm it is also provided that the diaphragm has on its inner and outer peripheries circular-section annular beads. These beads facilitate clamping of the diaphragm and sealing of the diaphragm.

In addition the first piston is frustoconically tapered from its end facing toward the diaphragm piston to its end facing away therefrom so as to define with the respective valve seat, depending on its axial position relative to the piston valve seat, a different defined flow cross-section. This geometric configuration alone prevents or at least counteracts the first piston from getting stuck in its valve seat.

In order to ensure here reliable sealing in every axial position the first piston has a cylindrical section at the upstream end of the frustoconical taper, which cylindrical section together with the piston valve seat forms the closed or blocking position.

Moreover, a particularly preferred manner the piston valve seat, at least in the region which interacts with the first piston, consists of a material which has only a minimal or no tendency to adhere to lime. Hereby, jamming and sticking of the first piston in the piston valve seat is avoided or prevented. To this end the piston valve seat consists of polytetrafluoroethylene (PTFE) or is coated therewith. Alternatively or additionally that the first piston is coated with PTFE or consists thereof.

BRIEF DESCRIPTION OF THE DRAWING

The above and other objects, features, and advantages will become more readily apparent from the following description, reference being made to the accompanying drawing in which.

DETAILED DESCRIPTION OF THE INVENTION

Figure 1:
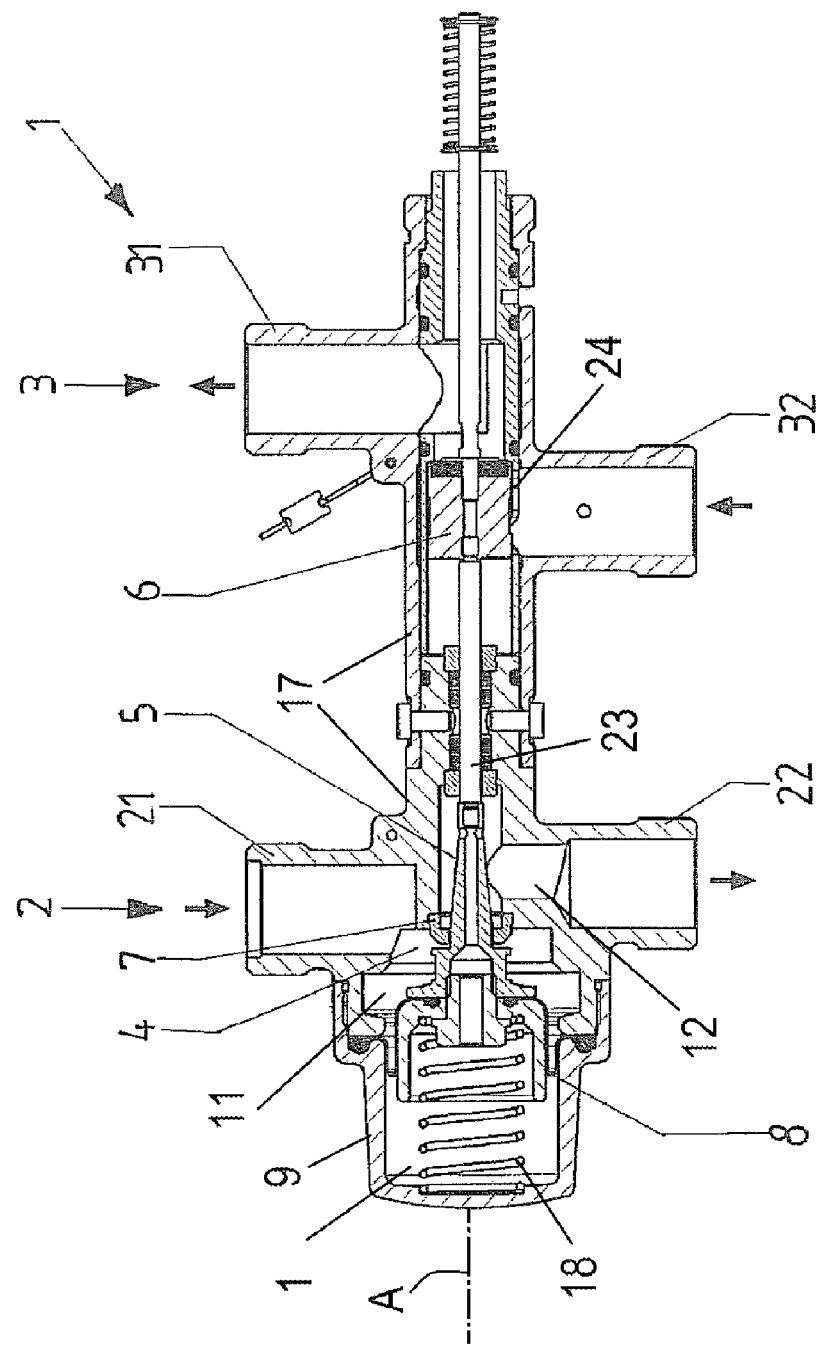
FIG. 1 is an axial or longitudinal section through a flow-control valve according to the invention.

As seen in FIG. 1 a flow-control valve 1 has a housing made of standard production materials, normally cast and machined metal, and intended for use in heating and/or cooling systems operated with liquid or gaseous media. A housing 17 of the flow-control valve 1 has relative to a housing axis A diametrally opposite first input and output ports 21 and 22 and, axially offset therefrom, second input and output ports 31 and 32 for respective fluid streams 2 and 3 that are separate from each other. In the first stream 2 there is between the ports 21 and 22 a differential valve 4 having a first piston or valve body 5 and a valve seat 7 that assume different positions depending on the flow rate or a pressure differential across the seat 7. Axial displacement of the first piston 5 is transmitted by mechanical coupling elements, for example a rod 23, to a second valve body or piston 6 located in the second stream 3 and interfitting with a second window-type valve seat 24. The axial position of the second piston 6 determines the flow cross section defined between it and the second seat 24, like the first piston 5 and its seat 7.

The first piston 5 is sealed via a flexible annular diaphragm 8 whose inner periphery is fixed to a diaphragm piston 15 carried on the valve body 5 and whose outer periphery is secured in a housing cap 9 so as to define an outer compartment 19 between the cap 9 and the outer face of the annular diaphragm 8 and an inner compartment 11 defined by the diaphragm's inner face between the valve seat 5 and the input port 21. A coil compression spring 18 in the compartment 19 urges the valve 4 into the closed position. Thus the pressure in the inner compartment 11 is the pressure upstream of the seat 7. The pressure downstream of the piston valve seat 7 in an output compartment 12 between the valve seat 7 and the outlet port 12 is transmitted to the outer compartment 19 via a passage or axial bore 13 extending through the first piston 5 and the diaphragm piston 15 and having an end opening axially into the compartment 19 and an opposite end formed by a transverse bore 14 and opening into the outlet compartment 12.

Preferably, for cost-effective manufacture, the bore 13 is aligned on the center axis A of the first piston 5 and the diaphragm piston 14. Near the coupling point of the rod 23 connected to the second piston 6, the transverse bore 14 extends perpendicular to the bore 13.

In a preferred manner, the diaphragm piston 15 has at its inner and outer peripheries beads 10 that allow it to be clamped and simultaneously form an O-ring seal, on the one hand with the housing 17 and on the other hand with the valve body 5.

Figure 2:
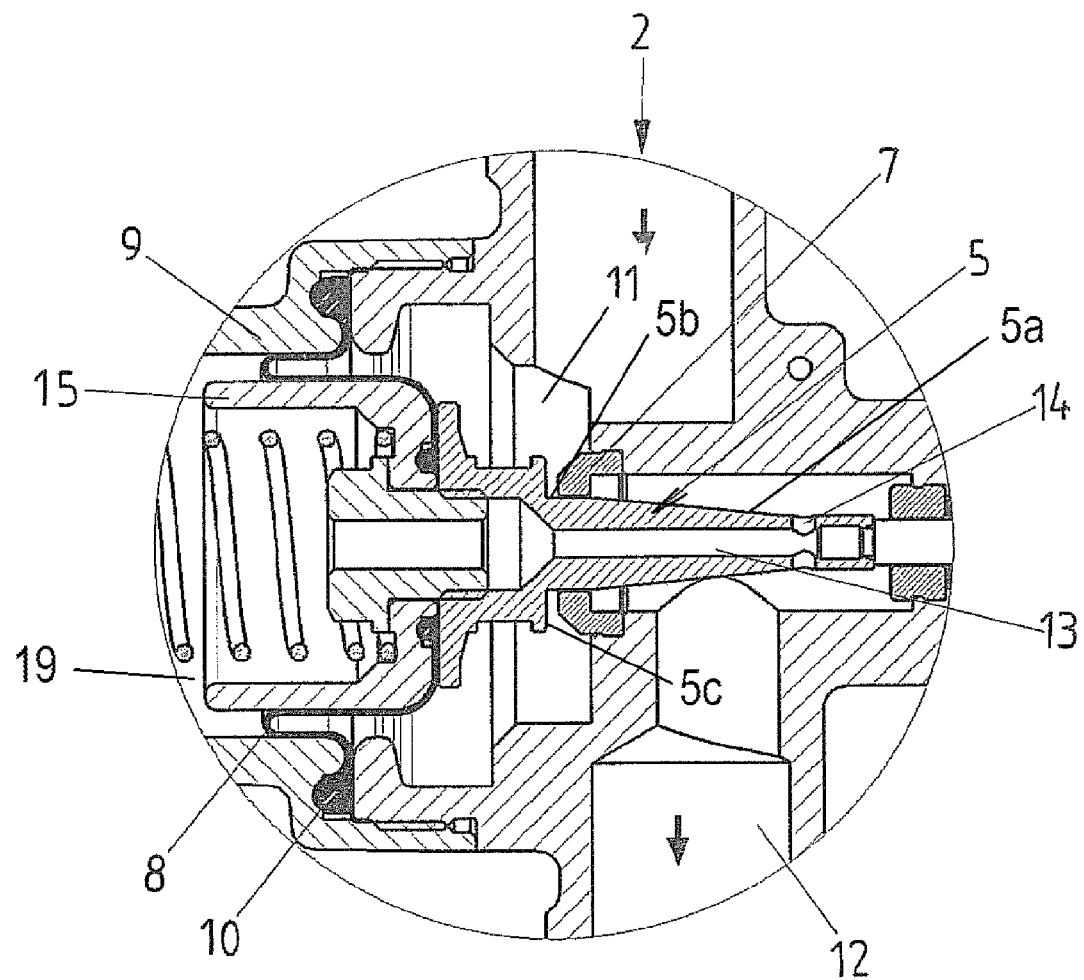
FIG. 2 is an enlarged detail of FIG. 1.
Figure 3:
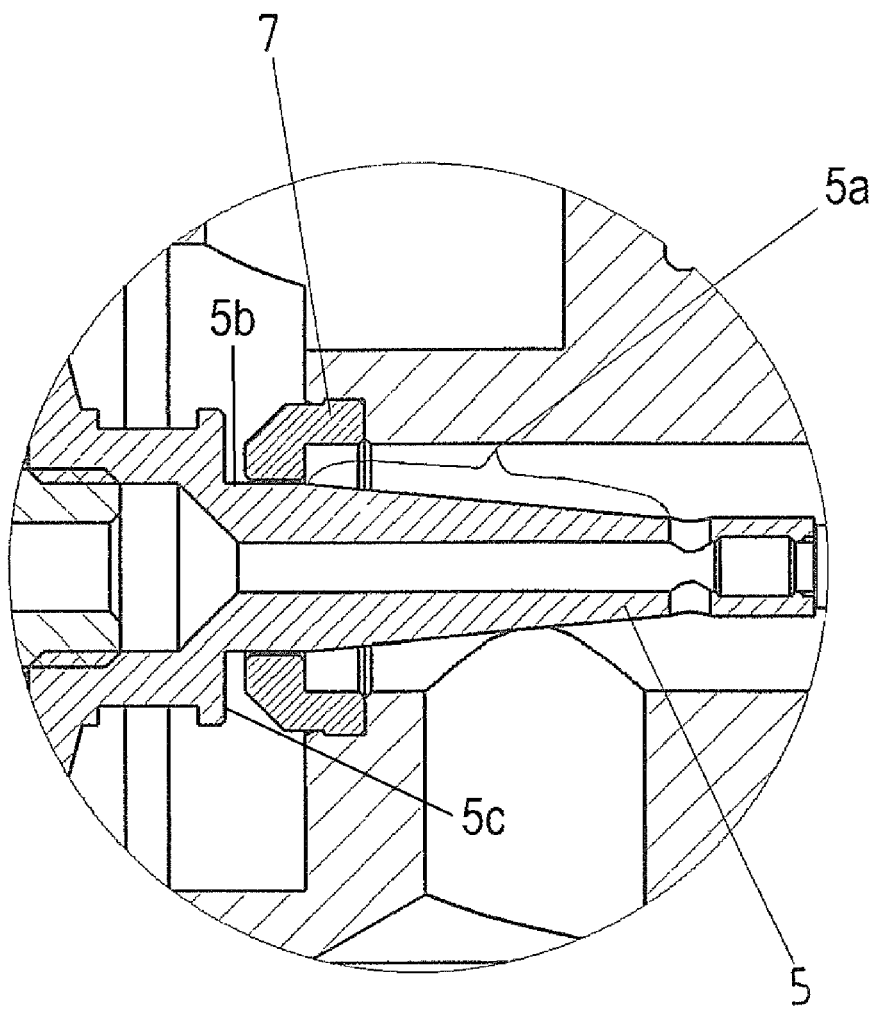
FIG. 3 is a further enlarged detail of FIG. 2.

As clearly shown in particular in FIGS. 2 and 3, the first piston 5 is formed with a stem having an end portion with a frustoconical outer surface 5a tapering away from the diaphragm piston 15. It also has a planar annular face 5c engageable with a complementary end face of the seat 7, which here is formed as an L-section ring set in the housing 17 and having a cylindrical central hole centered on the axis A. A cylindrical intermediate surface 5b between the surfaces 5a and 5c is a snug fit in the seat 7 so that it closes the valve 4 when engaged therein as shown in FIG. 3.

Here, in order to prevent lime from depositing on the critical valve parts, the seat 7 is formed of polytetrafluoroethylene, and the surfaces 5a-5c can be coated with the same material.

The invention is a flow-control valve that can be manufactured in a cost-effective manner, and where with respect to the prior art, a reduction of the number of parts is achieved. Machining of the critical piston 5 is simple since it is axially symmetrical except for t the bore 14, that itself is easily formed. The result is a cost advantage with respect to manufacture. In addition, jamming of the movable piston 5 due to lime deposits or contamination is also avoided.

The invention is not limited to the illustrated embodiment but is highly variable within the context of the disclosure.

All new individual and combined features disclosed in the description and/or drawing are to be considered as essential for the invention.

We claim:

1. A flow-control valve comprising:
   a housing extending along an axis and having first and second input ports and respective first and second output ports for respective first and second separate fluid streams and formed between the first input port and first output port with a first valve seat having an axially throughgoing cylindrical hole and between the second input port and second output port with a second valve seat offset axially from the first valve seat;
   respective first and second valve bodies axially shiftable between positions blocking and unblocking the respective valve seats, the first valve body being a stem extending axially through the cylindrical hole of the first valve seat and having a portion with a frustoconical outer surface centered on the axis and axially thereadjacent a portion with a cylindrical outer surface that is also centered on the axis and that is a snug fit in the hole, whereby a flow cross section of the first valve seat is varied when the frustoconical surface is in the hole by an axial position of the stem and the first valve seat is blocked when the cylindrical surface engages in the hole;
   a coupling element connected axially between the valve bodies for joint movement of the valve bodies; and
   a diaphragm connected between the first valve body and the housing and defining between the diaphragm and the first valve seat an axially inner compartment into which the first input port opens and between the diaphragm and the housing an axially outer compartment, the stem of the first valve body being formed with a passage extending through the first valve body and having an axially extending part opening into the outer compartment and a transversely extending part opening into the an outer compartment of the housing between the first valve seat and the first output port.

2. The flow-control valve defined in claim 1, wherein the first valve body is centered on the axis and the axial part of the passage extends on the axis and the transverse part is between the first and second valve bodies.

3. The flow-control valve defined in claim 1, wherein the diaphragm is annular, centered on the axis, and has an inner periphery secured to the first valve body and an outer periphery secured to the housing.

4. The flow-control valve defined in claim 2, wherein each of the inner and outer peripheries of the diaphragm has an annular mounting bead.

5. The flow-control valve defined in claim 1 wherein the first valve body has a flange in the inner compartment flatly abuttable against the first valve seat and a cylindrical surface fittable snugly in the first valve seat lies between the flange and the frustoconical surface.

6. The flow-control valve defined in claim 1, wherein the first valve body has a surface juxtaposable or engageable with the first valve seat and formed of a nonliming material.

7. The flow-control valve defined in claim 6 wherein the material is polytetrafluoroethylene.

8. The flow-control valve defined in claim 6 wherein the first valve seat has a surface juxtaposable or engageable with the first valve body and formed of a nonliming material.

9. The flow-control valve defined in claim 1, further comprising a spring in the outer compartment and urging the first valve body into the blocking position.

10. The flow-control valve defined in claim 1, wherein the first valve seat is a hole centered on the axis and the first valve body includes a flange engageable axially with the housing around the first seat and a stem extending along the axis through the hole and formed with the passage.

\* \* \* \* \*